US009366776B2

(12) United States Patent
Xian et al.

(10) Patent No.: US 9,366,776 B2
(45) Date of Patent: Jun. 14, 2016

(54) INTEGRATED FORMATION MODELING SYSTEMS AND METHODS

(75) Inventors: ChengGang Xian, Abu Dhabi (AE); Chengli Dong, Sugar Land, TX (US); Oliver C. Mullins, Ridgefield Road, CT (US); Ricardo R. Vasques, Holte (DK)

(73) Assignee: Schlumberger Technology Corporation, Sugar Land, TX (US)

( * ) Notice: Subject to any disclaimer, the term of this patent is extended or adjusted under 35 U.S.C. 154(b) by 874 days.

(21) Appl. No.: 13/295,085

(22) Filed: Nov. 13, 2011

(65) Prior Publication Data
US 2012/0147704 A1 Jun. 14, 2012

Related U.S. Application Data

(60) Provisional application No. 61/418,353, filed on Nov. 30, 2010.

(51) Int. Cl.
*G01V 1/28* (2006.01)
*G01V 1/50* (2006.01)

(52) U.S. Cl.
CPC . *G01V 1/50* (2013.01); *G01V 1/282* (2013.01); *G01V 2210/61* (2013.01); *G01V 2210/614* (2013.01)

(58) Field of Classification Search
CPC ..... G01V 1/282; G01V 1/50; G01V 2210/60; G01V 2210/61; G01V 2210/614
USPC ..................................... 367/73, 38
See application file for complete search history.

(56) References Cited

U.S. PATENT DOCUMENTS

| | | | | |
|---|---|---|---|---|
| 4,679,174 A * | 7/1987 | Gelfand | | 367/73 |
| 4,969,130 A * | 11/1990 | Wason et al. | | 367/73 |
| 5,081,612 A * | 1/1992 | Scott et al. | | 367/38 |
| 5,257,242 A * | 10/1993 | Clawson | | 367/38 |
| 5,383,114 A * | 1/1995 | Chambers | | 702/16 |
| 6,766,254 B1 * | 7/2004 | Bradford et al. | | 367/73 |
| 6,970,397 B2 * | 11/2005 | Castagna et al. | | 367/73 |
| 7,424,367 B2 * | 9/2008 | Saltzer et al. | | 702/14 |
| 2005/0007876 A1 * | 1/2005 | Castagna et al. | | 367/38 |
| 2011/0288831 A1 * | 11/2011 | Tan et al. | | 703/2 |

OTHER PUBLICATIONS

P. Breton et al., "Well Positioned Seismic Measurements," Oilfield Review, pp. 32-45, Spring, 2002.
Mullins, O.C., Hashem, M., Elshahawi, H., Fujisawa, G., Dong, C., Betancourt, S., and Terabayashi, T.: "Hydrocarbon Compositional Analysis In-Situ in Openhole Wireline Logging", paper presented in SPWLA 45th Annual Logging Symposium, Jun. 6-9, 2004.
Dong, C., Elshahawi, H., Mullins, O.C., Venkataramanan, L., Hows, M., McKinney, D., Flannery, M., and Hashem, M.: "Improved Interpretation of Reservoir Architecture and Fluid Contacts through the Integration of Downhole Fluid Analysis with Geochemical and Mud Gas Analyses", paper SPE 109683, presented in Asia Pacific Oil and Gas Conference & Exhibition (APOGCE), Oct. 30-Nov. 1, 2007, Jakarta, Indonesia.
Elshahawi, H., Hashem, M., Mullins, O.C., and Fujisawa, G.: "The Missing Link—Identification of Reservoir Compartmentalization Through Downhole Fluid Analysis", paper SPE94709, presented in SPE Annual Technical Conference and Exhibition, Oct. 9-12, 2005, Dallas, Texas.

* cited by examiner

*Primary Examiner* — Ian J Lobo
(74) *Attorney, Agent, or Firm* — Daryl R. Wright; Jody DeStefanis (57) ABSTRACT

Integrated formation modeling systems and methods are described. An example method of performing seismic analysis of a subterranean formation includes obtaining seismic data of the formation, obtaining fluid from the formation and analyzing at least some of the fluid to determine a fluid parameter. The example method additionally includes generating a model of the formation based at least on the seismic data and modifying the model based on the fluid parameter.

19 Claims, 8 Drawing Sheets

INTEGRATED FORMATION MODELING SYSTEMS AND METHODS

FIELD OF THE DISCLOSURE

This patent relates to modeling systems and, more specifically, to integrated formation modeling systems and methods.

BACKGROUND

Evaluation of subterranean formations may involve using computers to generate models that simulate the formation. These models may provide an effective method of obtaining a better understanding of the formation. Some formation models may be generated by obtaining seismic data of the formation and then performing an inversion process using the obtained seismic data to identify one or more formation properties used to generate the model. In some instances, some data used in connection with these inversions may be calculated based on the Bantzle & Wang model.

DETAILED DESCRIPTION

In the following detailed description of the preferred embodiments, reference is made to the accompanying drawings, which form a part hereof, and within which are shown by way of illustration specific embodiments by which the invention may be practiced. It is to be understood that other embodiments may be utilized and structural changes may be made without departing from the scope of the invention. Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness. Additionally, several examples have been described throughout this specification. Any features from any example may be included with, a replacement for, or otherwise combined with other features from other examples.

In general, the example methods and apparatus described herein provide an integrated modeling system that enables generation and/or modification of formation models that accurately predict and/or distinguish between different zones and/or formations within a reservoir such as hydrocarbon formations, gas formations and/or water formations. More specifically, the example methods and apparatus provide an integrated modeling system that accurately describes a reservoir and/or identifies low resistivity pays within such a reservoir by integrating seismic data and downhole fluid analysis (DFA) data, including fluid property distribution, when generating and/or modifying formation models.

In some examples, the DFA data may effectively capture and/or identify spatial variations of formation fluids by analyzing and/or scanning formation fluid from different locations within a formation such as different vertical and/or lateral locations to sufficiently identify fluid distribution. Analyzing and/or scanning the formation fluid downhole as the fluid is being drawn from the formation and/or flowing through a downhole tool enables one or more parameters to be identified in substantially real-time. The identified fluid parameter(s) may be utilized to modify or refine a formation model based on seismic inversion and/or an interval of interest within such a formation model.

The DFA data may be integrated with the seismic data prior to and/or after performing an inversion process to identify one or more formation properties. The identified formation properties may then be used in developing the formation model. For example, the DFA data may be integrated into a previously generated formation model to interpret the formation model by, for example, identifying fluid distribution within the formation. The previously generated formation model may be generated based on results of an inversion process using seismic data, DFA data and/or sonic data. In other examples, the DFA data may be integrated with the seismic data by using the DFA data as a direct input along with the seismic data in an inversion process.

If the DFA data is used to modify formation models such as cross-plots of rock physics models generated based on results of seismic inversion, the DFA data may be used to constrain the cross-plot. By constraining the cross-plot, results of the cross-plot may be interpreted by correlating locations of where the DFA data was obtained with corresponding locations on the cross-plot to identify fluid distribution within the reservoir. Such fluid distribution information may be used to accurately separate and/or distinguish between hydrocarbon formations, gas formations and/or water formations even if such hydrocarbon formations are low resistivity pays. The fluids (e.g., hydrocarbon, gas, water, etc.) identified using DFA and then correlated with the cross-plot data may be differentiated by color on the cross-plot. For example, blue may represent water formations, yellow may represent gas formations and red may represent hydrocarbon formations. This constrained cross-plot may then be mapped into three-dimensional (3D) seismic attributes to obtain 3D distribution of reservoir fluid types, for example.

If the DFA data is used to generate formation models such as cross-plots of rock physics models, the DFA data and/or PVT data may be used as direct inputs in a seismic inversion process. The results of the seismic inversion process may then be used to generate cross-plots of rock physics models. The cross-plots may be used to identify characteristics of the reservoir such as lithology, porosity, fluid types, saturation, etc. The results of the seismic inversion may also be used to establish an Equation of State (EOS) of reservoir fluids that may be correlated and/or matched to the DFA measurements at corresponding locations within the reservoir. The EOS of the reservoir fluids may be used to determine and/or calculate fluid densities and/or viscosities under different reservoir pressures and temperatures and may be used to capture and/or determine fluid heterogeneities.

In addition to the DFA data, other measurements such as sonic velocities of the formation fluid may be used as direct inputs in a seismic inversion process. At least some of the DFA data may be measured using a first downhole tool such as the InSitu Fluid Analyzer from Schlumberger and at least some of the sonic velocities may be measured using a second downhole tool such as the MDT Modular Formation Dynamics Tester from Schlumberger. As discussed above, the results of the seismic inversion may also be used to establish an Equation of State (EOS) of reservoir fluids that may be correlated and/or matched to the DFA measurements at corresponding locations within the reservoir. The EOS of the reservoir fluids may be used to determine and/or calculate fluid densities and/or viscosities under different reservoir pressures and temperatures. Additionally or alternatively, the measured density, viscosity and acoustic velocity may be used to determine the bulk modulus of the formation fluids.

Figure 1:
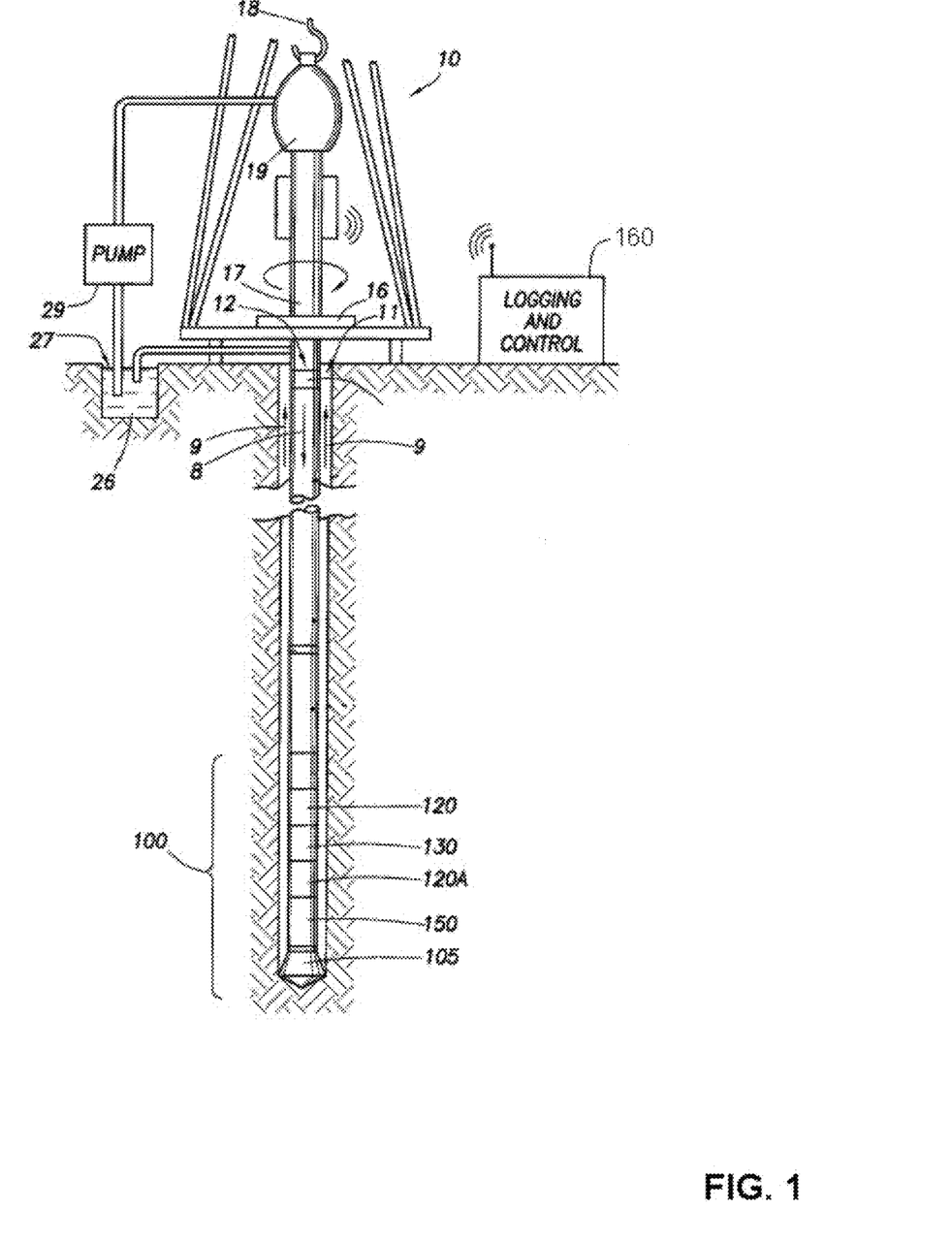
FIG. 1 depicts a schematic illustration of an example wellsite system according to one or more aspects of the present disclosure.

FIG. 1 illustrates an example wellsite system in which the examples described herein can be employed. The wellsite can be onshore or offshore. In this example, a borehole 11 is formed in subsurface formation by rotary and/or directional drilling.

As illustrated in FIG. 1, a drill string 12 is suspended within the borehole 11 and has a bottom hole assembly (BHA) 100 having a drill bit 105 at its lower end. The surface system includes a platform and derrick assembly 10 positioned over the borehole 11. The derrick assembly 10 including a rotary table 16, a kelly 17, a hook 18 and a rotary swivel 19. The drill string 12 is rotated by the rotary table 16, energized by means not shown, which engages the kelly 17 at the upper end of the drill string 12. The example drill string 12 is suspended from the hook 18, attached to a traveling block (also not shown), and through the kelly 17 and the rotary swivel 19, which permits rotation of the drill string 12 relative to the hook 18. Additionally or alternatively, a top drive system could be used.

In the example depicted in FIG. 1, the surface system further includes drilling fluid or mud 26 stored in a pit 27 formed at the well site. A pump 29 delivers the drilling fluid 26 to the interior of the drill string 12 via a port in the rotary swivel 19, causing the drilling fluid to flow downwardly through the drill string 12 as indicated by directional arrow 8. The drilling fluid 26 exits the drill string 12 via ports in the drill bit 105, and then circulates upwardly through the annulus region between the outside of the drill string 12 and the wall of the borehole 11, as indicated by directional arrows 9. The drilling fluid 26 lubricates the drill bit 105, carries formation cuttings up to the surface as it is returned to the pit 27 for recirculation and creates a mudcake layer (not shown) on the walls of the borehole 11.

The example bottom hole assembly 100 includes a logging-while-drilling (LWD) module 120, a measuring-while-drilling (MWD) module 130, a roto-steerable system and motor 150, and the drill bit 105.

The LWD module 120 may be housed in a special type of drill collar, as is known in the art, and can contain any number of logging tools. It will also be understood that more than one LWD and/or MWD module can be employed, e.g. as represented at 120A. References, throughout, to a module at the position of 120 can alternatively mean a module at the position of 120A as well.

The LWD module 120 may include capabilities for measuring, processing, and storing information, as well as for communicating with the surface equipment, such as, for example, a logging and control computer 160. While the logging and control computer 160 is depicted uphole and adjacent the wellsite system, a portion or all of the logging and control computer 160 may be positioned in the bottom hole assembly 100 and/or in a remote location. In this example, the LWD module 120 includes a seismic measuring device.

The MWD module 130 may be housed in a special type of drill collar, as is known in the art, and can contain one or more devices for measuring characteristics of the drill string 12 and/or the drill bit 105. The MWD module 130 may further include an apparatus (not shown) for generating electrical power to the downhole system. The apparatus may include a mud turbine generator powered by the flow of the drilling fluid. However, other power and/or battery systems may be employed. In this example, the MWD module 130 may include one or more measuring devices such as a weight-on-bit measuring device, a torque measuring device, a vibration measuring device, a shock measuring device, a stick slip measuring device, a direction measuring device and/or an inclination measuring device.

Although the components of FIG. 1 are shown and described as being implemented in a particular conveyance type, the example methods and apparatus described herein are not limited to a particular conveyance type but, instead, may be implemented in connection with different conveyance types including, for example, coiled tubing, wireline, wired drillpipe, and/or any other conveyance types known in the industry.

FIGS. 2-5 illustrate seismic-while-drilling tools 200, 300, 400 and/or 500 that can be used to implement at least part of the LWD module 120, or can be a part of an LWD tool suite 120A of the type disclosed in P. Breton et al., "Well Positioned Seismic Measurements," Oilfield Review, pp. 32-45, Spring, 2002, incorporated herein by reference. The seismic-while-drilling tools 200, 300, 400 and/or 500 may include a single receiver 202 (FIG. 2) and 302 (FIG. 3) or a plurality of receivers 402-406 (FIG. 4) and 502-516 (FIG. 5), and can be employed in conjunction with a single seismic source or transmitter 204 (FIG. 2) or 408 (FIG. 4) at the surface or a plurality of seismic sources or transmitters 304-314 (FIG. 3) or 518-532 (FIG. 5) at the surface.

Figure 2:
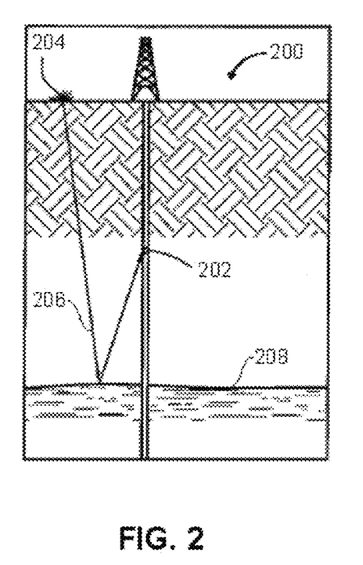
FIGS. 2-5 depict sonic while drilling tools having one or more seismic sources and one or more receivers.
Figure 3:
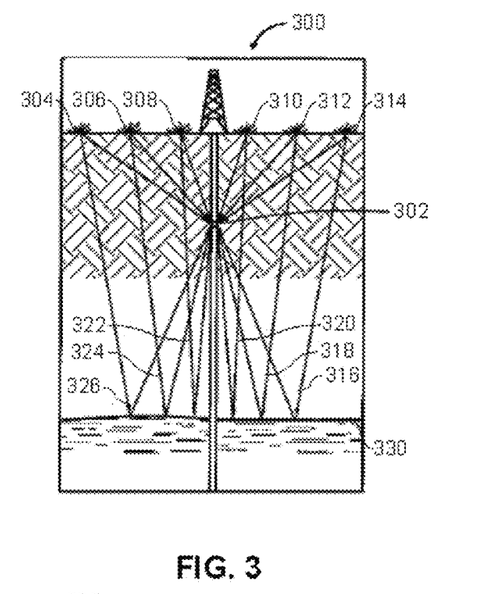
Figure 4:
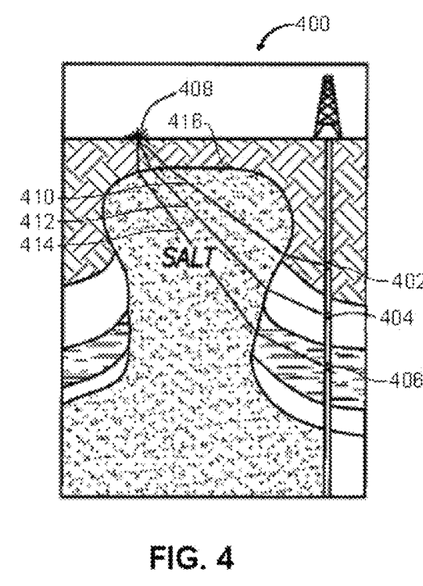
Figure 5:
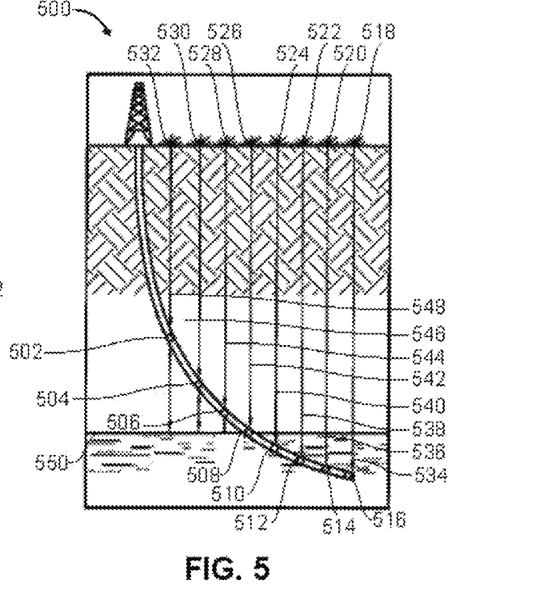

FIG. 2 depicts a signal 206 reflecting off a bed boundary 208, and may be referred to as a "zero-offset" vertical seismic profile arrangement. The tool 200 includes the single source 204 and the single receiver 202. FIG. 3 depicts signals 316-326 reflecting off a bed boundary 330, and may be referred to as a "walkaway" vertical seismic profile arrangement. The tool 300 includes the plurality of sources 304-314 and the single receiver 302. FIG. 4 depicts signals 410-414 refracting through salt dome boundaries 416, and may be referred to as a "salt proximity" vertical seismic profile. The tool 400 includes the single source 408 and the plurality of receivers 402-406. FIG. 5 includes signals 534-548 some of which are reflecting off of a bed boundary 550, and may be referred to as a "walk above" vertical seismic profile. The tool 500 includes the plurality of sources 518-532 and the plurality of receivers 502-516.

Figure 6:
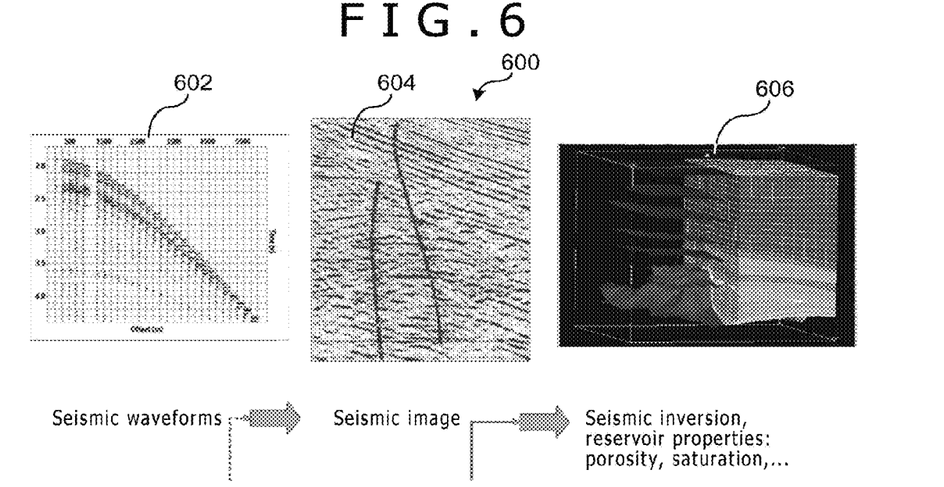
FIG. 6 depicts an example workflow.

FIG. 6 depicts an example workflow 600. Reference number 602 relates to seismic acquisition. Seismic acquisition relates to the process of generating and/or recording seismic data. In some examples, the seismic acquisition may be performed using, for example, any of the seismic-while-drilling tools 200, 300, 400 and/or 500. Reference number 604 relates to seismic processing. Seismic processing may relate to processing the seismic data to suppress noise, enhance signal and/or migrate seismic events to the appropriate location in space, for example. Based on the processing, a seismic image may be produced that is more easily interpretable. Reference number 606 relates to a seismic inversion process. Based on the results of the seismic inversion, a 3D rock property model may be constructed that is used to identify formation properties such as porosity, saturation, etc.

In some examples, fluid properties may be added to seismic inversion processes to make the results of such an inversion more accurate. For example, rock-bearing fluids may be more accurately described by combining fluid properties and rock properties as represented by the rock physics model of Equations 1 and 2.

$$\frac{1}{M_{model} + M_0} = \sum_i \frac{(1-\phi)V_i}{M_i + M_0} + \frac{\phi}{M_{fluid} + M_0}; \qquad \text{Equation 1}$$

where $$M_0 = m_0 \exp(m_1 x_1 + m_2 x_2 + \ldots + m_{exp} \exp(-x_{exp}/m_{0,exp})) \qquad \text{Equation 2}$$

$M_{model}$ relates to modeled (shear or bulk) modulus, PHIT relates to Total Porosity, Ø relates to porosity, $V_i$ relates to mineral volume fraction, $M_i$ relates to mineral modulus, $x_k$ relates to regression variables, $M_{fluid}$ relates to pore fluid modulus, $m_k$ relates to a regression parameter and $M_o$ relates to a regression function. The pore fluid modulus ($M_{fluid}$) may be associated with pressure, temperature and fluid properties such as density, viscosity and/or acoustic velocity.

In some examples, these fluid properties are calculated from the Bantzle & Wang model. The Bantzle and Wang model correlates density, viscosity and acoustic velocity of live oil to density and GOR of dead oil under different pressure and temperature conditions. In some instances, these correlations are inaccurate because of the complex nature of crude oil mixtures. For example, different crude oils having a similar density may have up to two orders of viscosity difference because of different asphaltene levels. Another source of error occurs by over simplifying reservoir fluids as homogeneous (e.g., gas, oil or water) and then calculating the associated fluid properties as constants across a hydrocarbon field and/or a basin from the Bantzle & Wang model. By characterizing fluid properties as constants across a hydrocarbon field and/or basin, an inaccurate formation model may be generated given that reservoir fluids may be spatially varying and/or heterogeneous.

In other examples, the spatial variations of reservoir fluids may be accurately identified and/or captured using DFA analysis. Thus, instead of calculating fluid properties based on the Bantzle & Wang model that may result in a generalization that inaccurately describes the reservoir fluid(s), using the examples described herein, the fluid properties may be measured in-situ and then these measured values may be used to determine the pore fluid modulus ($M_{fluid}$) used in Equation 1 and/or to refine any model generated based on the rocks physics model of Equation 1. In contrast to the examples that calculate fluid properties based on the Bantzle & Wang model, DFA analysis enables formation fluid to be obtained and/or analyzed from different points within the formation enabling a relatively accurate representation of the fluid distribution within the formation to be identified. For example, using a downhole tool such as the InSitu Fluid Analyzer from Schlumberger, a plurality of DFA data points may be obtained to capture spatial variations of the reservoir fluid(s).

Figure 7:
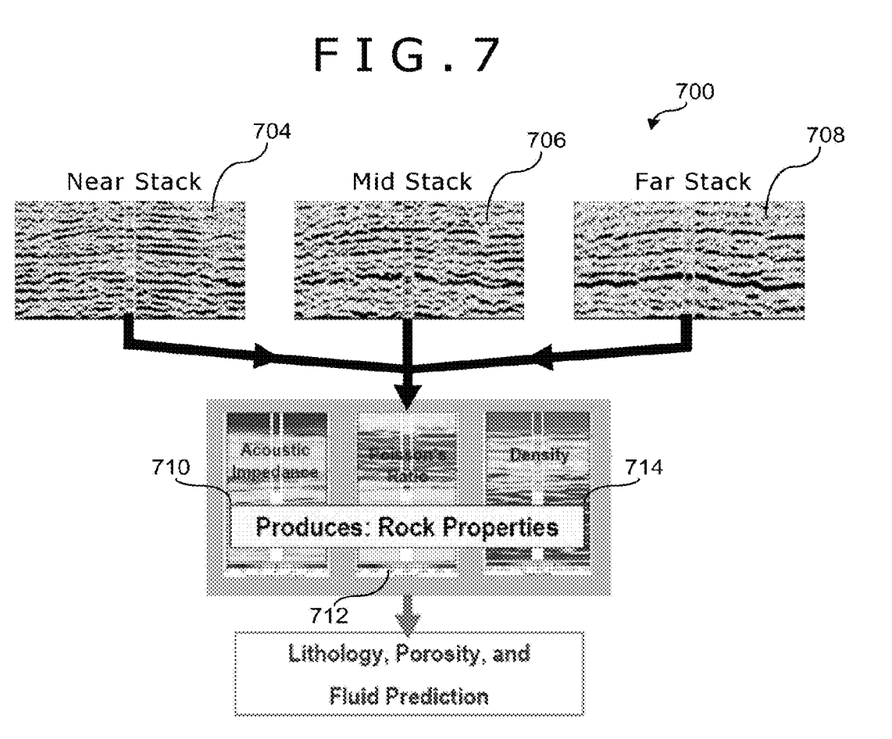
FIG. 7 depicts an example seismic process.

FIG. 7 depicts an example seismic process 700 to construct a 3D rock property model. The seismic process 700 may be an ISIS simultaneous amplitude versus offset (AVO) analysis and/or inversion. In some examples, data associated with a near stack 704, a mid-stack 706 and/or a far stack 708 may be used to generate the 3D rock property model. The 3D rock property model constructed may include seismic attributes such as acoustic impedance 710, Poisson's ratio 712 and/or density (e.g., bulk density) 714 calculated from results of the AVO analysis. In some examples, the rock properties and/or seismic attributes from inversion may be used to generate cross-plots of a rock physics model. The cross-plots may be used to identify lithology, porosity, fluid types and/or saturation, for example. In some examples, embedding DFA data (e.g., fluid properties) into the seismic process 700 (e.g., the AVO analysis) may improve seismic inversion properties generated and/or calculated therefrom.

Figure 8:
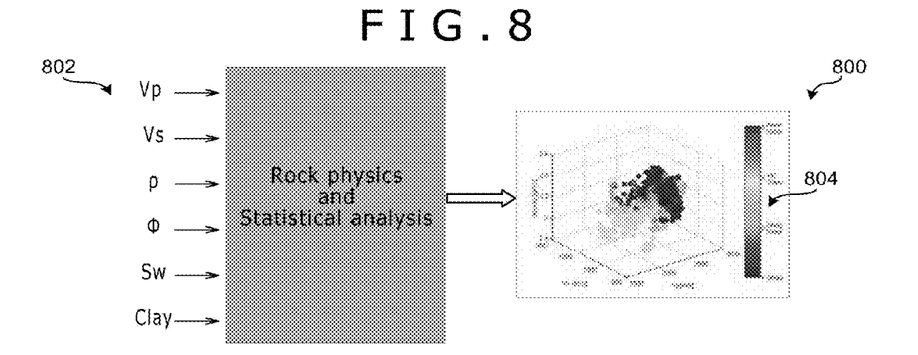
FIG. 8 depicts an example diagram of example inputs that may be used in a seismic inversion process.

FIG. 8 depicts an example diagram 800 illustrating a plurality of inputs 802 that may be used in a seismic inversion process. The results of the seismic inversion may be used to construct a cross-plot of a rock physics model 804. In some examples, the inputs 802 may include compressional-wave velocity ($V_p$), shear-wave velocity ($V_s$), density ($\rho$), porosity ($\phi$) and/or water saturation ($S_w$). In some examples, the cross-plot of the rock physics model may be used to identify key interests such as lithology, fluid types, etc. In some examples, the cross-plot of the rock physics model 804 may be used for the estimation of seismic reservoir properties based on the ability to map seismic fields such as P-impedance, Poisson's ratio and/or bulk density into reservoir properties such as porosity, saturation and/or clay content. The cross-plot of the rock physics model 804 may be generated using a seismic mapping procedure that is non-unique and, thus, the rock physics model 804 may be constrained using external information such as DFA data to more accurately represent the reservoir.

Figure 9:
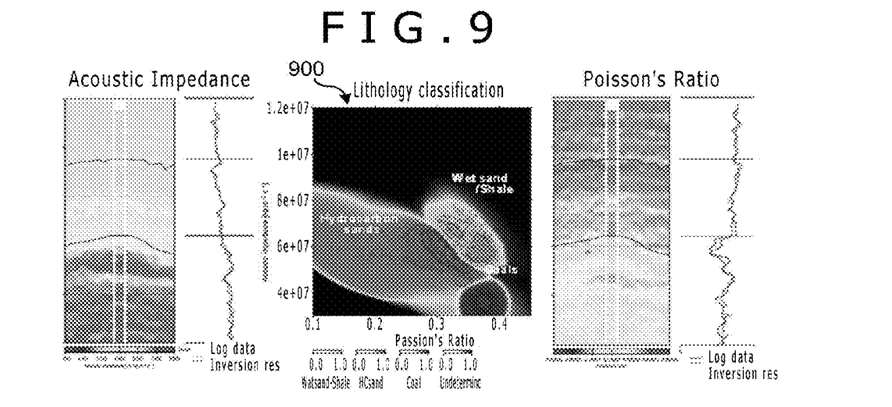
FIG. 9 depicts an example cross-plot of a rock physics model.

FIG. 9 depicts an example cross-plot of a rock physics model 900 that may be used to identify lithology and/or fluid types. However, other cross-plots may be generated instead. If the cross-plot 900 is generated using rock properties such as Acoustic Impedance and/or Poisson's Ratio identified by seismic inversion, the accuracy of the cross-plot may be associated with the accuracy of the rock properties calculated from seismic inversion.

In some examples, to differentiate between hydrocarbon sands (hydrocarbon formations) and/or water sands (e.g., water formations), logs may need to be interpreted for lithology classification (FIG. 8). However, log interpretations may be unreliable when there are low resistivity pays, spatial variations of formation water properties and/or complex but unclear mineralogies, especially in early stages of exploration or appraisal. This unreliability, in turn, makes distinguishing between hydrocarbon and/or water sands unreliable.

In other examples, hydrocarbon sands (hydrocarbon formations) and/or water sands (e.g., water formations) may additionally and/or alternatively be differentiated using DFA data. Thus, instead of relying on log interpretation to differentiate between formations (e.g., hydrocarbon formations, gas formations, water formations, etc.) of the reservoir, using the examples described herein, the cross-plot 900 may be more reliably interpreted by obtaining DFA data from fluid in the reservoir and then integrating this DFA data into the cross-plot 900. The locations of where the DFA data is obtained within the reservoir may be correlated with the corresponding locations on the cross-plot to identify fluid distribution within the reservoir and/or to more accurately interpret the cross-plot 900.

Figure 10:
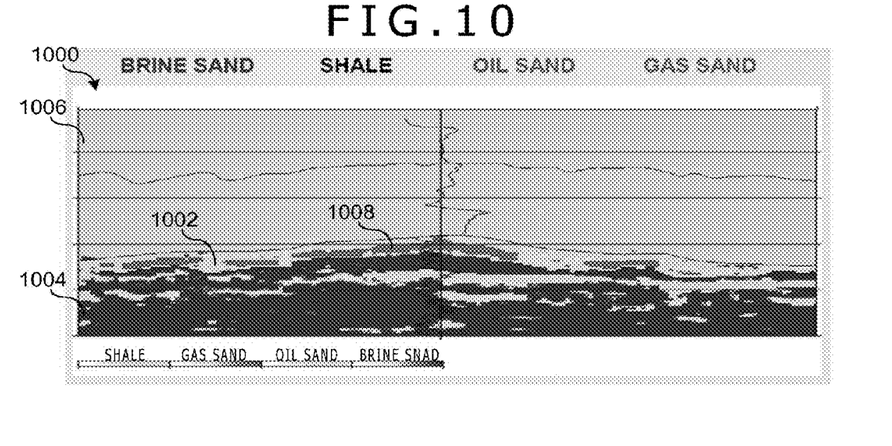
FIG. 10 depicts an example three-dimensional reservoir model.

FIG. 10 depicts an example 3D reservoir model (e.g., Lithocube results) 1000 having spatial distributions of hydrocarbon sands, formations or zones 1002, water sands, formations or zones 1004, shale formations or zones 1006 and gas sands, formations or zones 1008. The 3D reservoir model 1000 may have been generated after the rock physics model was applied to the cross-plots of, for example, FIG. 9. The 3D reservoir model 1000 may be used for well planning, positioning, etc.

Figure 11:
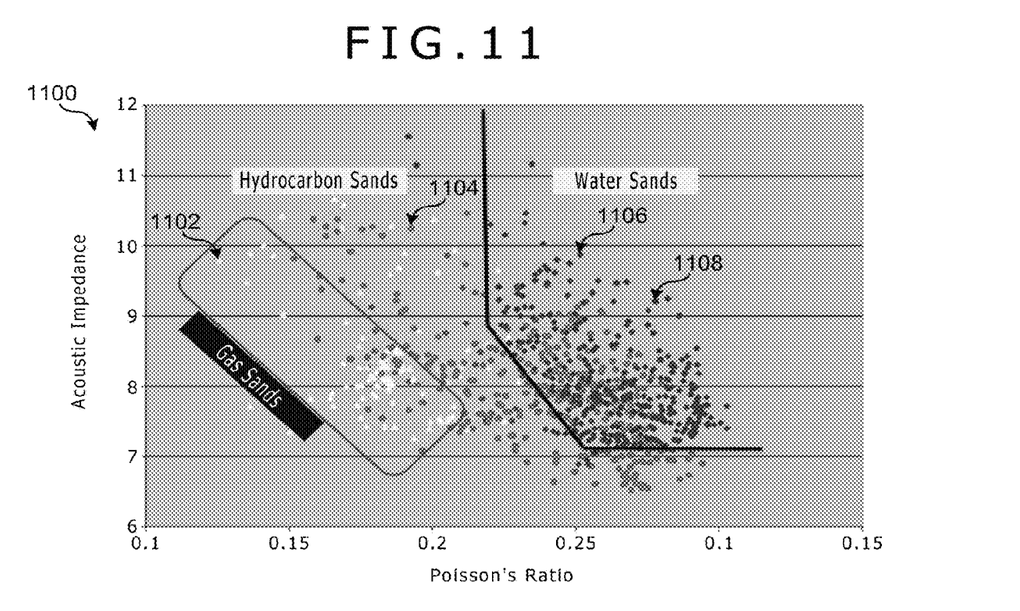
FIGS. 11 and 12 depict example cross-plots constrained using the examples described herein.

FIG. 11 represents an example Poisson's Ratio vs. Acoustic Impedance cross-plot 1100 constrained by DFA data from multiple wells that enables different formations such as hydrocarbon formations, gas formations, water formations, etc. to be more easily differentiated and/or identified. Constraining the cross-plot using DFA data may be advantageous to identify and/or differentiate between hydrocarbon formations and water formations in open hole logs because of low resistivity responses of such formations and spatial variations of connate water properties.

As illustrated in FIG. 11, using the examples described herein, gas formations 1102 and a majority of hydrocarbon formations 1104 may be separated and/or differentiated from water formations 1106. Additionally, using the cross-plot 1100 on outputs of seismic inversion, gas formations 1102 and a majority of hydrocarbon formations 1104 across the associated field may be reliably predicted. As illustrated in FIG. 11, by constraining the cross-plot 1100 with the DFA data, it may be identified that some hydrocarbon formations overlay water formations at, for example, 1108.

Figure 12:
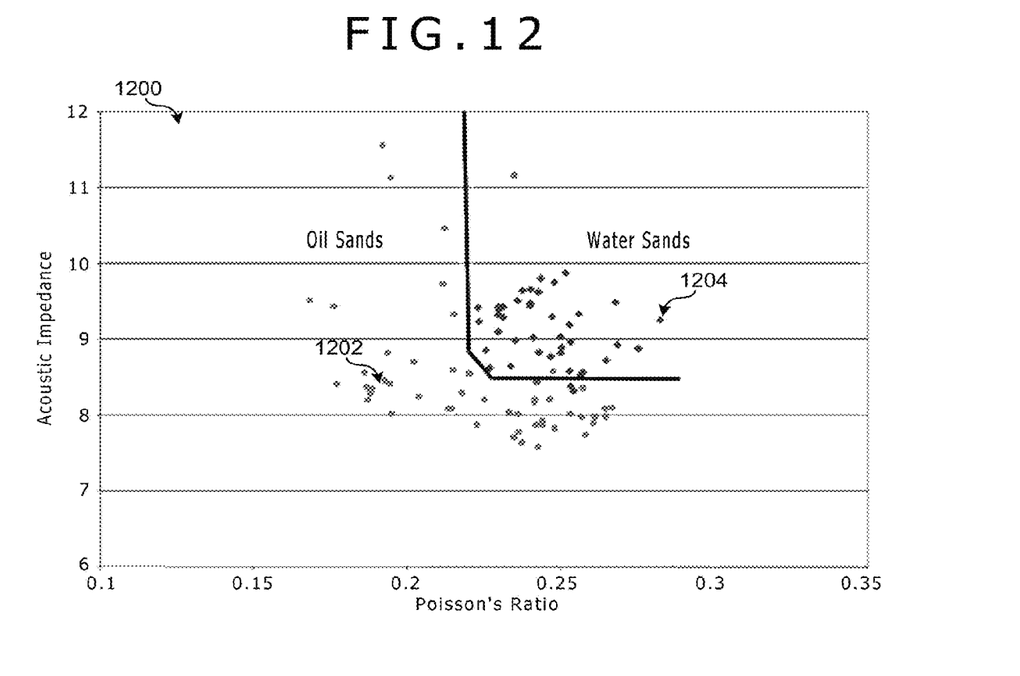

FIG. 12 depicts an example cross-plot 1200 of an interval of interest from the cross-plot 1100 of FIG. 11. As illustrated in FIG. 12, hydrocarbon sands 1202 and water sands 1204 may be accurately identified and/or separated. Thus, by using DFA data that captures spatial variations of formation fluid, seismic inversion for prediction of hydrocarbon formations per an interval interest may be refined.

Figure 13:
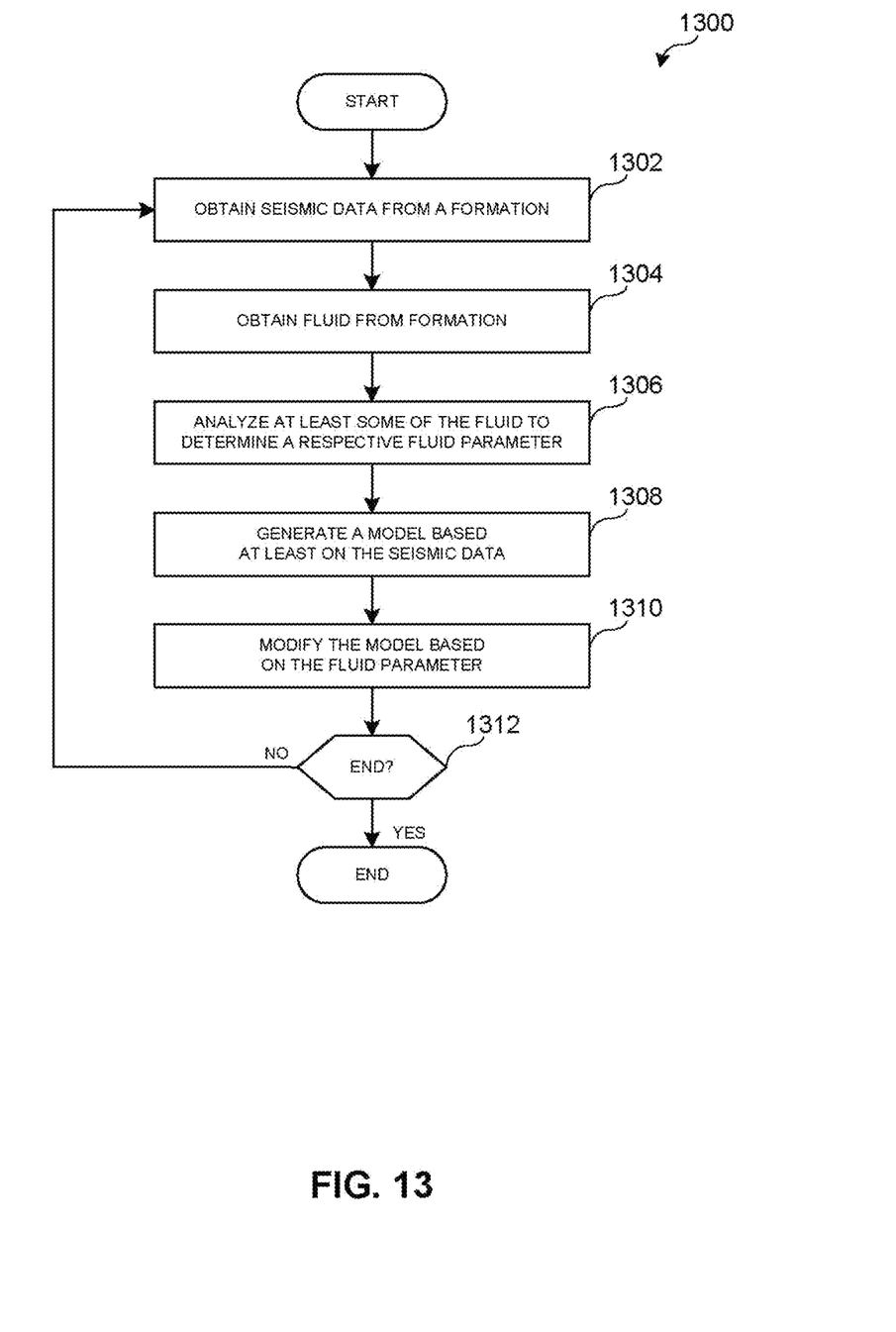
FIGS. 13 and 14 depict example processes according to one or more aspects of the present disclosure.
Figure 14:
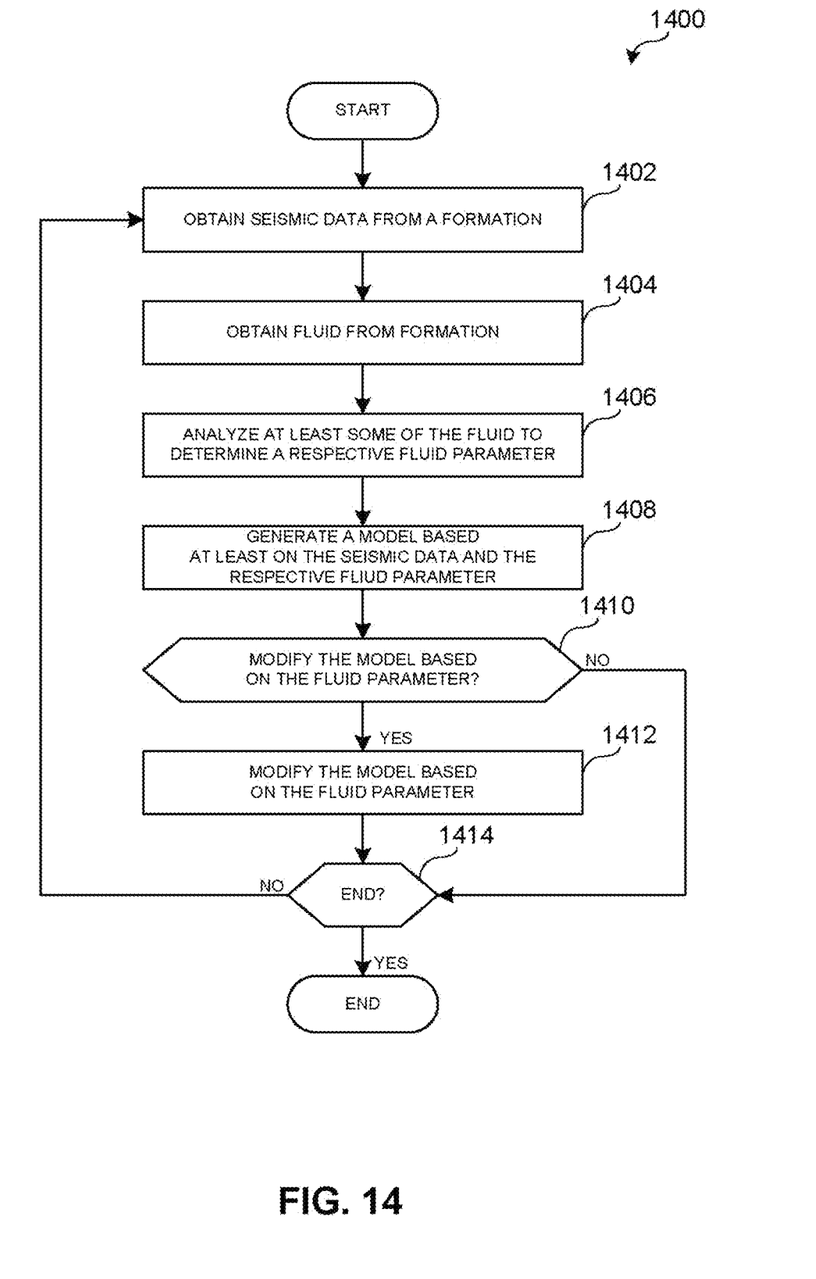

FIGS. 13 and 14 depict example flow diagrams representative of processes that may be implemented using, for example, computer readable instructions that may be used to generate and/or modify formation models based on seismic data, DFA data and/or sonic velocities. The example processes of FIGS. 13 and 14 may be performed using a processor, a controller and/or any other suitable processing device. For example, the example processes of FIGS. 13 and 14 may be implemented using coded instructions (e.g., computer readable instructions) stored on a tangible computer readable medium such as a flash memory, a read-only memory (ROM), and/or a random-access memory (RAM). As used herein, the term tangible computer readable medium is expressly defined to include any type of computer readable storage and to exclude propagating signals. Additionally or alternatively, the example processes of FIGS. 13 and 14 may be implemented using coded instructions (e.g., computer readable instructions) stored on a non-transitory computer readable medium such as a flash memory, a read-only memory (ROM), a random-access memory (RAM), a cache, or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals.

Alternatively, some or all of the example processes of FIGS. 13 and 14 may be implemented using any combination(s) of application specific integrated circuit(s) (ASIC(s)), programmable logic device(s) (PLD(s)), field programmable logic device(s) (FPLD(s)), discrete logic, hardware, firmware, etc. Also, some or all of the example processes of FIGS. 13 and 14 may be implemented manually or as any combination(s) of any of the foregoing techniques, for example, any combination of firmware, software, discrete logic and/or hardware. Further, although the example processes of FIGS. 13 and 14 are described with reference to the flow diagrams of FIGS. 13 and 14, other methods of implementing the processes of FIGS. 13 and 14 may be employed. For example, the order of execution of the blocks may be changed, and/or some of the blocks described may be changed, eliminated, sub-divided, or combined. Additionally, any or all of the example processes of FIGS. 13 and 14 may be performed sequentially and/or in parallel by, for example, separate processing threads, processors, devices, discrete logic, circuits, etc.

FIG. 13 depicts an example process 1300 that may be used with the example apparatus described herein to generate and/or modify formation models. The process 1300 begins by obtaining seismic data from the formation. (block 1302). The seismic data may be obtained using, for example, the seismic-while-drilling tools 200, 300, 400 and/or 500. Prior to, during and/or after obtaining the seismic data, the process 1300 may pump and/or obtain fluid from the formation. (block 1304). The fluid may be obtained by pumping the fluid to a probe assembly of a downhole tool, for example. In some examples, as the fluid is pumped from the formation, at least some of the fluid may be analyzed in-situ to determine one or more fluid parameters (e.g., DFA data). (block 1306). The one or more fluid parameters may include density, viscosity, composition(s) (e.g., C1, C2, C3-5, C6, $CO_2$, etc.), gas-oil-ratio, pH, reflection/fluorescence property, etc. To analyze the fluid, the fluid flowing through the downhole tool may be scanned using, for example, a spectrometer or other device. More specifically, the fluid may be analyzed using the Live Fluid Analyzer (LFA) of Schlumberger, the Composition Fluid Analyzer (CFA) of Schlumberger, the InSitu Fluid Analyzer (IFA) of Schlumberger, etc. In other examples, samples of the fluid being drawn from the formation may be obtained for analysis at the surface.

The process 1300 may then generate a model based on the seismic data, DFA data, PVT data and/or sonic data. (block 1308). More specifically, the process 1300 may perform an inversion process using the seismic data, DFA data, PVT data and/or sonic data and then generate a formation model based on the results of such an inversion. If the model is generated using seismic data, the model generated may be based on the rock physics model of Equation 1 using fluid parameters calculated based on the Bantzle & Wang model.

If the model is generated using seismic data and DFA data, instead of calculating the fluid parameters using the Bantzle & Wang model, the fluid parameters may be determined based on the DFA data. As discussed above, DFA data more accurately identifies spatial variations of formation fluid and, thus, more accurately identifies fluid distribution within the formation. In some examples, in addition to the DFA data, PVT data and/or sonic velocities may additionally be used in generating the formation model. Such additional data may further improve the results of inversion and, thus, the formation model generated therefrom. If sonic velocities such as compressional-wave velocities and/or shear-wave velocities are used in the inversion, the DFA data may be obtained using a first downhole tool and the seismic properties may be obtained using a second downhole tool. For example, the second tool may measure seismic properties such as compressional-wave velocities and/or shear-wave velocities at each phase of the reservoir fluid downhole at a plurality of stations on the tool and such measurements may be used in the inversion. Additionally or alternatively, the second tool may measure fluid modulus such as compression modulus, shear modulus and/or bulk modulus at each phase of the reservoir fluid and such measurements may be used in the inversion. However, in other examples, both the DFA data and the sonic data are obtained using the same downhole tool.

In some examples, as part of a quality control process, results of inversion obtained using sonic data may be compared to results of inversion obtained from the Bantzle & Wang model.

The process 1300 may then modify the model generated at block 1308 based on the fluid parameter. (block 1310). For example, the identified fluid parameter may be used to clarify different zones such as a hydrocarbon zone, a gas zone and/or a water zone within a cross plot of a rock physics model. More generally, DFA data may accurately identify the fluid type(s) within a reservoir such as oil, gas and/or water, fractional flows of multiple phases and/or properties of the reservoir fluids. The DFA data may be obtained at a plurality of locations within the formation to identify spatial variations of reservoir fluids. By correlating locations where the respective DFA data was obtained with the corresponding locations on the cross plot of a rock physics model, the cross-plot may be more accurately interpreted and/or the different formations (e.g., hydrocarbon, gas water, etc.) within the reservoir may be identified. At block 1312, the process 1300 determines whether or not to return control to block 1302, otherwise example process 1300 is ended.

FIG. 14 depicts an example process 1400 that may be used with the example apparatus described herein to generate and/or modify formation models. The process 1400 begins by obtaining seismic data from the formation. (block 1402). The seismic data may be obtained using, for example, the seismic-while-drilling tools 200, 300, 400 and/or 500. Prior to, during and/or after obtaining the seismic data, the process 1400 may pump and/or obtain fluid from the formation. (block 1404). The fluid may be obtained by pumping the fluid to a probe assembly of a downhole tool, for example. In some examples, as the fluid is pumped from the formation, at least some of the fluid may be analyzed in-situ to determine one or more fluid parameters (e.g., DFA data) such as density, viscosity, composition(s), gas-oil-ratio, etc. (block 1406). In other examples, samples of the fluid being drawn from the formation may be obtained for analysis at the surface.

The process 1400 may then generate a model based on the seismic data, DFA data, PVT data and/or sonic data. (block 1408). More specifically, the process 1400 may perform an inversion process using the seismic data, DFA data, PVT data and/or sonic data and then generate a formation model based on the results of such an inversion. If the model is generated using seismic data and DFA data, the fluid parameters may be determined based on the DFA data. As discussed above, DFA data more accurately identifies spatial variations of formation fluid and, thus, more accurately identifies fluid distribution within the formation. In some examples, in addition to the DFA data, PVT data and/or sonic velocities may additionally be used in generating the formation model. Such additional data may further improve the results of inversion and, thus, the formation model generated therefrom.

At block 1410, the process 1400 may determine whether or not to modify the model based on the fluid parameter. If the process 1400 decides to modify the model, control moves to block 1412 and the model generated at block 1408 may be modified based on the fluid parameter. (block 1412). Modifying the model may further constrain the cross-plot of a rock physics model and, thus, improve its accuracy. For example, the identified fluid parameter may be used to clarify different zones such as a hydrocarbon zone, a gas zone and/or a water zone within a cross plot of a rock physics model. More generally, DFA data may accurately identify the fluid type(s) within a reservoir such as oil, gas and/or water, fractional flows of multiple phases and/or properties of the reservoir fluids. The DFA data may be obtained at a plurality of locations within the formation to identify spatial variations of reservoir fluids. By correlating locations where the respective DFA data was obtained with the corresponding locations on the cross plot of a rock physics model, the cross-plot may be more accurately interpreted and/or the different formations (e.g., hydrocarbon, gas water, etc.) within the reservoir may be identified. At block 1414, the process 1400 determines whether or not to return control to block 1402, otherwise example process 1400 is ended.

Figure 15:
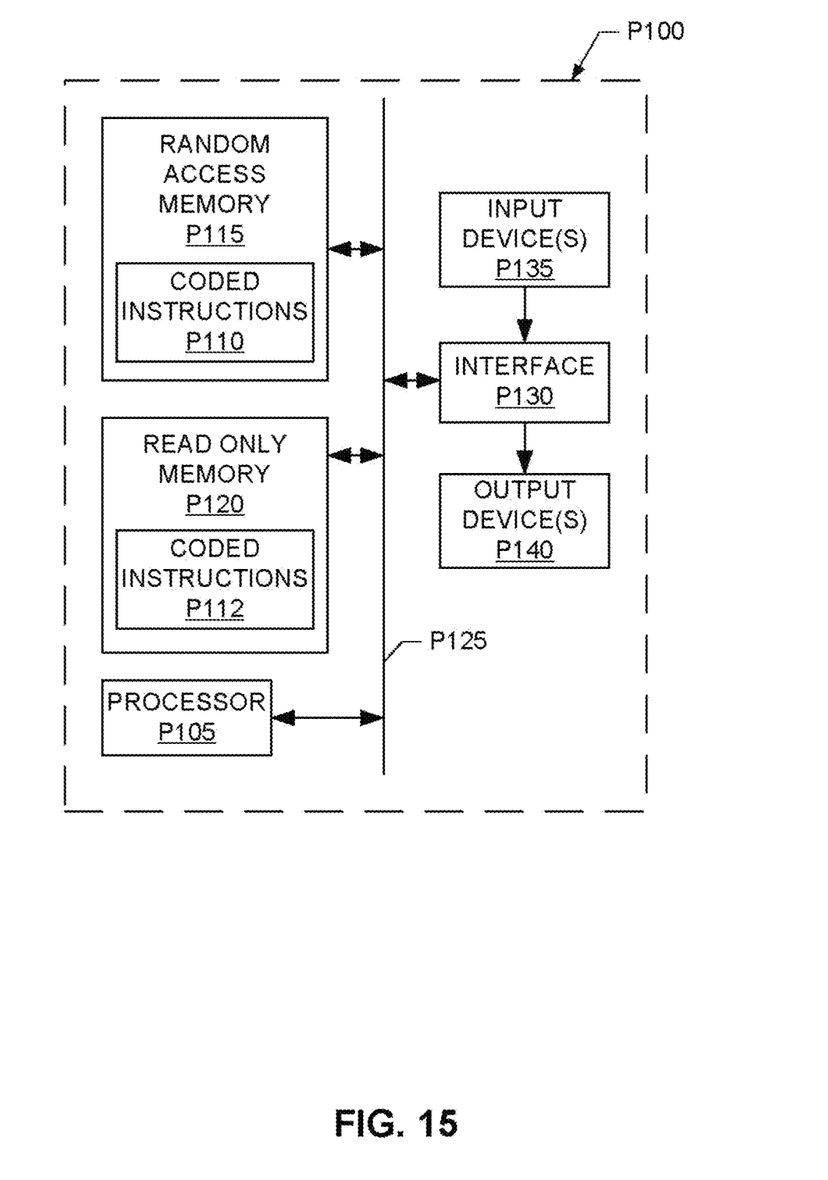
FIG. 15 is a schematic of an example processor platform that may be used and/or programmed to implement the example methods and apparatus described herein.

FIG. 15 is a schematic diagram of an example processor platform P100 that may be used and/or programmed to implement all or a portion of any or all of the example processing units or modules described herein. The processor platform P100 of the example of FIG. 15 includes at least one general-purpose programmable processor P105. The processor P105 executes coded instructions P110 and/or P112 present in main memory of the processor P105 (e.g., within a RAM P115 and/or a ROM P120). The processor P105 may be any type of processing unit, such as a processor core, a processor and/or a microcontroller. The processor P105 may execute, among other things, the example processes described herein or, more generally, to implement the example methods and apparatus described herein.

The processor P105 is in communication with the main memory (including a ROM P120 and/or the RAM P115) via a bus P125. The RAM P115 may be implemented by dynamic random-access memory (DRAM), synchronous dynamic random-access memory (SDRAM), and/or any other type of RAM device, and ROM may be implemented by flash memory and/or any other desired type of memory device. Access to the memory P115 and the memory P120 may be controlled by a memory controller (not shown).

The processor platform P100 also includes an interface circuit P130. The interface circuit P130 may be implemented by any type of interface standard, such as an external memory interface, serial port, general-purpose input/output, etc. One or more input devices P135 and one or more output devices P140 are connected to the interface circuit P130.

The example methods and apparatus provide an integrated modeling system that accurately describes a reservoir and/or identifies low resistivity pays within such a reservoir by integrating seismic data and downhole fluid analysis (DFA) data, including fluid property distribution, when generating and/or modifying formation models. The DFA data may be integrated with the seismic data prior to and/or after performing an inversion process to identify one or more formation properties used in developing formation models. If the DFA data is used to modify formation models, the DFA data may be used to constrain the cross-plot. If the DFA data is used to generate formation models, the DFA data and/or PVT data may be used as direct inputs in a seismic inversion process. In addition to the DFA data, other measurements such as sonic velocities of the formation fluid may be used as direct inputs in a seismic inversion process.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:
1. A method of performing seismic analysis of a subterranean formation, comprising:
   obtaining seismic data of the formation;
   obtaining fluid from the formation;
   analyzing at least some of the fluid to determine a fluid parameter;

generating a model of the formation based at least on the seismic data; and determining whether or not to modify the model based on the fluid parameter, wherein generating the model comprises generating the model based at least on the seismic data and the fluid parameter, wherein modifying the model comprises interpreting the model based on the fluid parameter by correlating a location where the analyzed fluid was obtained within the formation with a corresponding location on the model to identify fluid distribution within the formation.

2. The method of claim 1, wherein analyzing at least some of the fluid comprises analyzing at least some of the fluid in-situ.

3. The method of claim 2, wherein analyzing at least some of the fluid in-situ comprises analyzing at least some of the fluid in substantially real-time.

4. The method of claim 1, wherein generating the model comprises inverting the seismic data to identify a formation property.

5. The method of claim 1, wherein modifying the model comprises interpreting seismic inversion data based on the fluid parameter.

6. The method of claim 5, wherein interpreting the seismic inversion data comprises differentiating between at least some of hydrocarbon formations, gas formations, or water formations.

7. The method of claim 5, wherein interpreting the seismic inversion data comprises differentiating between a first zone and a second zone, at least a part of the second zone being different than the first zone.

8. The method of claim 1, wherein analyzing at least some of the fluid comprises scanning the fluid to determine a fluid parameter.

9. The method of claim 1, wherein the fluid parameter comprises at least one of density, viscosity, composition, or gas-oil-ratio.

10. The method of claim 1, wherein the model comprises a set of cross-plots.

11. The method of claim 1, further comprising analyzing fluid from a plurality of locations within the formation to determine a respective fluid parameter of the fluid from each of the locations, and modifying the model based on the fluid parameters.

12. The method of claim 11, wherein at least some of the analyzed fluid is from different depths of the formation.

13. The method of claim 12, wherein analyzing at least some of the fluid comprises analyzing fluid from at least one of different lateral locations within the formation or different vertical locations within the formation.

14. The method of claim 12, wherein modifying the model comprises correlating the fluid parameters at the different depths with the seismic data to identify fluid distribution within the formation.

15. The method of claim 14, wherein identifying fluid distribution within the formation comprises color coding the model associated with fluid types to identify the fluid distribution.

16. A method of performing seismic analysis of a subterranean formation, comprising:

obtaining seismic data of the formation;

obtaining fluid from the formation;

analyzing at least some of the fluid to determine a fluid parameter; and generating a model of the formation based at least on the seismic data and the fluid parameter, wherein generating the model is based at least on the seismic data and the fluid parameter, further comprising analyzing fluid from a plurality of locations within the formation to determine a respective fluid parameter of the fluid from each of the plurality of locations, and further comprising determining whether or not to modify the model based on the fluid parameter of the fluid from the respective locations, at least some of the respective locations being at different depths of the formation.

17. The method of claim 16, wherein analyzing at least some of the fluid comprises analyzing at least some of the fluid in-situ.

18. The method of claim 16, wherein modifying the model comprises interpreting seismic inversion data based on the fluid parameter.

19. The method of claim 16, wherein generating the model is further based on one or more sonic velocities of the formation fluid.

* * * * *